(12) United States Patent
Bai

(10) Patent No.: US 12,243,268 B2
(45) Date of Patent: Mar. 4, 2025

(54) PANORAMIC VIDEO PROCESSING METHOD AND APPARATUS, AND STORAGE MEDIUM

(71) Applicant: BEIJING BYTEDANCE NETWORK TECHNOLOGY CO., LTD., Beijing (CN)

(72) Inventor: Hequn Bai, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 364 days.

(21) Appl. No.: 17/618,398

(22) PCT Filed: Jun. 5, 2020

(86) PCT No.: PCT/CN2020/094507
§ 371 (c)(1),
(2) Date: Dec. 10, 2021

(87) PCT Pub. No.: WO2020/248900
PCT Pub. Date: Dec. 17, 2020

(65) Prior Publication Data
US 2022/0277481 A1  Sep. 1, 2022

(30) Foreign Application Priority Data
Jun. 10, 2019 (CN) .......................... 201910497871.1

(51) Int. Cl.
*G06T 7/73* (2017.01)
*G06T 7/246* (2017.01)
(Continued)

(52) U.S. Cl.
CPC ................ *G06T 7/75* (2017.01); *G06T 7/248* (2017.01); *G06T 7/66* (2017.01); *G06T 7/74* (2017.01);
(Continued)

(58) Field of Classification Search
CPC ..... G06T 7/75; G06T 7/74; G06T 7/66; G06T 7/248; G06T 2207/10021; H04N 5/265; H04S 7/30; H04S 2400/11
See application file for complete search history.

(56) References Cited

U.S. PATENT DOCUMENTS

| 2015/0350521 A1 | 12/2015 | Whitson et al. |
| 2016/0269712 A1 | 9/2016 | Ostrover et al. |

(Continued)

FOREIGN PATENT DOCUMENTS

| CN | 101119482 A | 2/2008 |
| CN | 105895108 A | 8/2016 |

(Continued)

OTHER PUBLICATIONS

International Patent Application No. PCT/CN2020/094507; Int'l Written Opinion and Search Report; dated Aug. 28, 2020; 7 pages.

*Primary Examiner* — Kyle M Lotfi
(74) *Attorney, Agent, or Firm* — BakerHostetler

(57) ABSTRACT

A method and device for processing a panoramic video, and a non-transitory storage medium are provided. The method includes: determining a reference frame in video frames of the panoramic video, and determining a target object in the reference frame; acquiring position information about a position of the target object in the reference frame; acquiring a motion track of the target object in the panoramic video based on the position information; and processing a to-be-processed audio frame based on the motion track to obtain a target audio frame capable of characterizing a position of the target object in the panoramic video, where the target audio frame is used to be synthesized with the video frames of the panoramic video to obtain a panoramic video file.

18 Claims, 8 Drawing Sheets

(51) Int. Cl.
    *G06T 7/66*          (2017.01)
    *H04N 5/265*      (2006.01)
    *H04S 7/00*        (2006.01)

(52) U.S. Cl.
    CPC ............ *H04N 5/265* (2013.01); *H04S 7/30* (2013.01); *G06T 2207/10021* (2013.01); *H04S 2400/11* (2013.01)

(56) References Cited

U.S. PATENT DOCUMENTS

| | | | |
|---|---|---|---|
| 2019/0054379 A1 | 2/2019 | Ackley et al. | |
| 2020/0302575 A1* | 9/2020 | Lee | G06F 9/48 |
| 2021/0012520 A1* | 1/2021 | Zhou | G01P 15/00 |
| 2021/0227132 A1* | 7/2021 | Cai | H04N 23/695 |
| 2021/0374972 A1* | 12/2021 | Xin | G06T 7/246 |

FOREIGN PATENT DOCUMENTS

| | | | |
|---|---|---|---|
| CN | 106210703 A | 12/2016 | |
| CN | 106331732 A | 1/2017 | |
| CN | 106992959 A | 7/2017 | |
| CN | 108319362 A | 7/2018 | |
| CN | 108777832 A | 11/2018 | |
| CN | 109188433 A | 1/2019 | |

\* cited by examiner

PANORAMIC VIDEO PROCESSING METHOD AND APPARATUS, AND STORAGE MEDIUM

CROSS REFERENCE TO RELATED APPLICATION

The present application is a national phase application of PCT international patent application PCT/CN2020/094507, filed on Jun. 5, 2020 which claims priority to Chinese Patent Application No. 201910497871.1, titled "PANORAMIC VIDEO PROCESSING METHOD AND APPARATUS, AND STORAGE MEDIUM", filed on Jun. 10, 2019 with the China National Intellectual Property Administration, both of which are incorporated herein by reference in their entireties

FIELD

Embodiments of the disclosure relate to a multimedia technology, and in particular to a method for processing a panoramic video, a device for processing a panoramic video and a storage medium.

BACKGROUND

With continuous development of communication infrastructure, a network communication speed of a terminal continues to increase, so that various media forms, especially videos, have been widely spread in the network as never before. Panoramic video is an extension of how a user perceives a video, and content in the video can be presented in a variety of ways.

In order to better display a three-dimensional play effect of the panoramic video, audio data of the panoramic video needs to reflect a position of a sound source, corresponding to the audio data, in the panoramic video. In related technologies, the processing of the audio data of the panoramic video relies on manual processing, which is inefficient.

SUMMARY

In view of this, a method for processing a panoramic video, a device for processing a panoramic video and a storage medium are provided according to the embodiments of the disclosure.

A method for processing a panoramic video is provided according to an embodiment of the disclosure. The method includes: determining a reference frame in video frames of the panoramic video, and determining a target object in the reference frame; acquiring position information about a position of the target object in the reference frame; acquiring a motion track of the target object in the panoramic video based on the position information; and processing a to-be-processed audio frame based on the motion track to obtain a target audio frame capable of characterizing a position of the target object in the panoramic video. The target audio frame is used to be synthesized with the video frames of the panoramic video to obtain a panoramic video file.

In the above solution, the acquiring position information about a position of the target object in the reference frame includes: identifying multiple feature points of the target object in the reference frame to obtain a feature point set corresponding to the target object; and acquiring the position information about the position of the target object in the reference frame based on the feature points in the feature point set. The position information includes: angle information about the position of the target object in the panoramic video; and a center distance about the position of the target object in the panoramic video. The center distance is a distance between the position of the target object in the panoramic video and a center of a three-dimensional model corresponding to the reference frame.

In the above solution, the acquiring the position information about the position of the target object in the reference frame based on the feature points in the feature point set includes: determining a centre-of-gravity position of the multiple feature points in the feature point set; determining the angle information about the position of the target object in the panoramic video based on the centre-of-gravity position; acquiring a pixel area of a region occupied by the multiple feature points in the reference frame; and determining the center distance about the position of the target object in the panoramic video based on the pixel area.

In the above solution, the determining the angle information about the position of the target object in the panoramic video based on the centre-of-gravity position includes: determining a pixel point coordinate of a pixel point corresponding to the centre-of-gravity position; and converting the pixel point coordinate into a spherical coordinate in the three-dimensional model. The spherical coordinate indicates an angle corresponding to the position of the target object in the panoramic video.

In the above solution, the determining the center distance about the position of the target object in the panoramic video based on the pixel area includes: determining the center distance about the position of the target object in the panoramic video based on an inverse relationship between the pixel area and a square of the center distance.

In the above solution, the method further includes: performing feature point matching on the multiple feature points in the feature point set and feature points in a non-reference frame of the panoramic video to obtain a feature point matching result; and determining a position of the target object in the non-reference frame based on the feature point matching result.

In the above solution, the determining a position of the target object in the non-reference frame based on the feature point matching result includes: selecting, based on the feature point matching result, a feature point in the non-reference frame a similarity between which and one of the feature points in the feature point set is greater than a first similarity threshold; and determining the position of the target object in the non-reference frame based on the selected feature point in the non-reference frame the similarity between which and one of the feature points in the feature point set is greater than the first similarity threshold.

In the above solution, the acquiring a motion track of the target object in the panoramic video based on the position information includes: acquiring position information about a position of the target object in each non-reference frame of the panoramic video; and determining the motion track of the target object in the panoramic video based on the position information about the position of the target object in the reference frame and the position information about a position of the target object in each non-reference frame.

In the above solution, the method further includes: selecting, based on the feature point matching result, a feature point in the non-reference frame a similarity between which and each of the feature points in the feature point set is less than a second similarity threshold; and updating the feature points in the feature point set based on the selected feature point in the non-reference frame the similarity between which and each of the feature points in the feature point set is less than the second similarity threshold.

In the above solution, the method further includes: acquiring the feature point matching results between each of a preset number of non-reference frames and the feature points in the feature point set, where the preset number of non-reference frames are continuous video frames of the panoramic video; determining a to-be-deleted feature point in the feature point set based on the feature point matching results, where a similarity between the to-be-deleted feature point and each of the feature points in the preset number of non-reference frames is less than a third similarity threshold; and deleting the to-be-deleted feature point from the feature point set.

In the above solution, the determining a target object in the reference frame includes: receiving an object selection operation for the reference frame; and determining the target object in the reference frame based on a region in the reference frame selected by the object selection operation.

In the above solution, the processing a to-be-processed audio frame based on the motion track to obtain a target audio frame capable of characterizing a position of the target object in the panoramic video includes: invoking a three-dimensional audio engine to perform mixing processing on the to-be-processed audio frame based on the motion track, to obtain the target audio frame capable of characterizing the position of the target object in the panoramic video.

A device for processing a panoramic video is provided according to an embodiment of the disclosure. The device includes: a determining unit, configured to determine a reference frame in video frames of the panoramic video, and determine a target object in the reference frame; an acquiring unit, configured to acquire position information about a position of the target object in the reference frame, and acquire a motion track of the target object in the panoramic video based on the position information; and a processing unit, configured to process a to-be-processed audio frame based on the motion track to obtain a target audio frame capable of characterizing a position of the target object in the panoramic video. The target audio frame is used to be synthesized with the video frames of the panoramic video to obtain a panoramic video file.

In the above solution, the acquiring unit is further configured to: identify multiple feature points of the target object in the reference frame to obtain a feature point set corresponding to the target object; and acquire the position information about the position of the target object in the reference frame based on the feature points in the feature point set. The position information includes: angle information about the position of the target object in the panoramic video; and a center distance about the position of the target object in the panoramic video. The center distance is a distance between the position of the target object in the panoramic video and a center of a three-dimensional model corresponding to the reference frame.

In the above solution, the acquiring unit is further configured to: determine a centre-of-gravity position of the multiple feature points in the feature point set; determine the angle information about the position of the target object in the panoramic video based on the centre-of-gravity position; acquire a pixel area of a region occupied by the multiple feature points in the reference frame; and determine the center distance about the position of the target object in the panoramic video based on the pixel area.

In the above solution, the acquiring unit is further configured to: determine a pixel point coordinate of a pixel point corresponding to the centre-of-gravity position; and convert the pixel point coordinate into a spherical coordinate in the three-dimensional model. The spherical coordinate indicates an angle corresponding to the position of the target object in the panoramic video.

In the above solution, the acquiring unit is further configured to determine the center distance about the position of the target object in the panoramic video based on an inverse relationship between the pixel area and a square of the center distance.

In the above solution, the device further includes a matching unit configured to perform feature point matching on the multiple feature points in the feature point set and feature points in a non-reference frame of the panoramic video to obtain a feature point matching result. The acquiring unit is further configured to determine a position of the target object in the non-reference frame based on the feature point matching result.

In the above solution, the acquiring unit is further configured to: select, based on the feature point matching result, a feature point in the non-reference frame a similarity between which and one of the feature points in the feature point set is greater than a first similarity threshold; and determine the position of the target object in the non-reference frame based on the selected feature point in the non-reference frame the similarity between which and one of the feature points in the feature point set is greater than the first similarity threshold.

In the above solution, the acquiring unit is further configured to: acquire position information about a position of the target object in each non-reference frame of the panoramic video; and determine the motion track of the target object in the panoramic video based on the position information about the position of the target object in the reference frame and the position information about a position of the target object in each non-reference frame.

In the above solution, the device further includes an updating unit configured to: select, based on the feature point matching result, a feature point in the non-reference frame a similarity between which and each of the feature points in the feature point set is less than a second similarity threshold; and update the feature points in the feature point set based on the selected feature point in the non-reference frame the similarity between which and each of the feature points in the feature point set is less than the second similarity threshold.

In the above solution, the device further includes a deleting unit configured to: acquire the feature point matching results between each of a preset number of non-reference frames and the feature points in the feature point set, where the preset number of non-reference frames are continuous video frames of the panoramic video; determine a to-be-deleted feature point in the feature point set based on the feature point matching results, where a similarity between the to-be-deleted feature point and each of the feature points in the preset number of non-reference frames is less than a third similarity threshold; and delete the to-be-deleted feature point from the feature point set.

In the above solution, the determining unit is further configured to: receive an object selection operation for the reference frame; and determine the target object in the reference frame based on a region in the reference frame selected by the object selection operation.

In the above solution, the processing unit is further configured to invoke a three-dimensional audio engine to perform mixing processing on the to-be-processed audio frame based on the motion track, to obtain the target audio frame capable of characterizing the position of the target object in the panoramic video.

A device for processing a panoramic video is provided according to an embodiment of the disclosure. The device includes: a memory storing executable instructions; a processor configured to execute the executable instructions to implement the method for processing a panoramic video according to the embodiments of the disclosure.

A non-transitory storage medium is provided according to an embodiment of the disclosure. The non-transitory storage medium stores executable instructions. The executable instructions are used to implement the method for processing a panoramic video according to the embodiments of the disclosure, when the executable instructions are executed.

The embodiments of the disclosure have the following beneficial effects. According to the above-mentioned embodiments of the disclosure, the motion track of the target object in the panoramic video is automatically acquired, the to-be-processed audio frame is automatically processed based on the motion track to obtain the target audio frame capable of characterizing the position of the target object in the panoramic video, thereby improving a processing efficiency of the audio data of the panoramic video.

DETAILED DESCRIPTION

Figure 1:
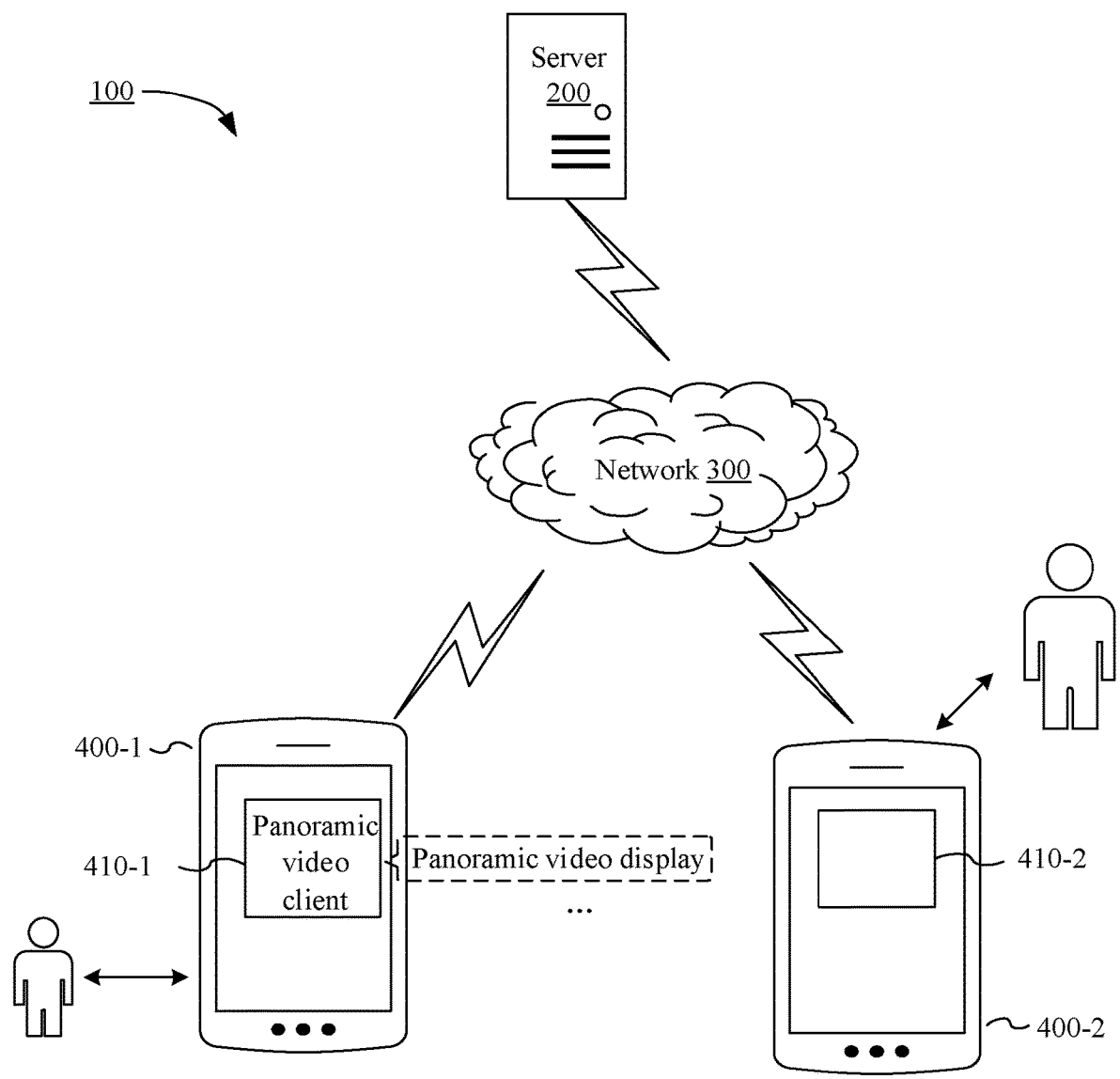
FIG. 1 is a schematic diagram shows an architecture of a system 100 for processing a panoramic video according to an embodiment of the disclosure.

In order to more clearly illustrate purposes, technical solutions and advantages of the disclosure, the disclosure is described in detail hereinafter with reference to the accompanying drawings. The described embodiments should not be regarded as limiting the disclosure. All other embodiments obtained by those of ordinary skill in the art without creative effort fall within the protection scope of the disclosure.

In the following description, "some embodiments" are referred to, which describe a subset of all possible embodiments, but it is understood that "some embodiments" may be the same subset or different subsets of all possible embodiments, and can be combined with each other without conflict.

In the following description, the term "first\second\third" involved only distinguishes similar objects, and does not represent a specific order for the objects. Understandably, a specific order or sequence of the objects defined by "first\second\third" may be interchanged where permitted, so that the embodiments of the disclosure described herein may be implemented in an order other than the order illustrated or described herein.

Before describing the embodiments of the disclosure in further detail, the names and terms involved in the embodiments of the disclosure are described. The names and terms involved in the embodiments of the disclosure are applicable to the following explanations.

1) A panoramic video refers to a video that can be watched by a user with a naked eye in various electronic devices, and a field of view of a play window can be adjusted in direction and magnification.

2) A three-dimensional model is a model that simulates a space expressed by the panoramic video. The three-dimensional model is used to map a video frame of the panoramic video to a surface of the three-dimensional model to form a surface texture. The surface of the three-dimensional model is generally spherical or cylindrical.

3) A field of view refers to a collection of lines of sight through which a virtual lens at a center of the three-dimensional model perceives the surface texture of the three-dimensional model. More generally, the field of view refers to a region that can be viewed in a video frame of the panoramic video through a window.

4) A play window refers to a full-screen or non-full-screen window used to play the panoramic video by default in a panoramic video client. The play window includes at least a video play region of the panoramic video, and may also include an operation region where a portal for a related operation is set.

5) The field of view of the play window refers to the field of view corresponding to the play window. The field of view of the play window controls a part of content in a corresponding field of view in the video frame that can be perceived in the play window.

6) A feature point refers to a point that can reflect a local feature (such as a color feature, a shape feature, and a texture feature) of an object in the image, generally feature points are a set of multiple pixel points. Taking a face image as an example, the feature point may be an eye feature point, a mouth feature point or a nose feature point, etc.

Based on the above explanation of the names and terms involved in the embodiments of the disclosure, the device for processing a panoramic video according to the embodiments of the disclosure will be described next. The device for processing a panoramic video according to the embodiments of the disclosure may be implemented in various forms, such as, implemented by a terminal alone such as a smart phone, a tablet computer, and a desktop computer, or implemented by a server alone, or implemented by a terminal and a server in cooperation.

As an example of the device for processing a panoramic video implemented by a terminal and a server in cooperation, reference is made to FIG. 1, which is a schematic diagram shows an optional architecture of a system 100 for processing a panoramic video according to an embodiment of the disclosure. As an exemplary application, a terminal 400 includes a terminal 400-1 (including a graphical interface 410-1) and a terminal 400-2 (including a graphical interface 410-2). The terminal 400 is connected to a server 200 through a network 300, and the terminal is provided with a panoramic video client. The user can realize the display of the panoramic video through the panoramic video client. The network 300 may be a wide area network or a local area network, or a combination of the wide area network and the local area network, and uses a wireless link to realize data transmission.

The terminal 400 (such as the terminal 400-1) is configured to: load data of a panoramic video; display video frames of the panoramic video; determine a reference frame in the video frames of the panoramic video based on the displayed video frames; determine a target object in the reference frame; and send an identifier of the reference frame and an identifier of the target object to the server 200.

The server 200 stores the data of the panoramic video, and is configured to: acquire position information about a position of the target object in the reference frame; acquire a motion track of the target object in the panoramic video based on the position information; and process a to-be-processed audio frame based on the motion track to obtain a target audio frame capable of characterizing a position of the target object in the panoramic video.

The server 200 is further configured to synthesize the target audio frame with the video frames of the panoramic video to obtain a panoramic video file and send the synthesized panoramic video file to the terminal 400.

The terminal 400 is also configured to play the panoramic video based on the received panoramic video file.

The device for processing a panoramic video according to the embodiments of the disclosure may be implemented by hardware or by a combination of software and hardware. The following describes various exemplary implementations of the device for processing a panoramic video according to the embodiments of the disclosure.

Figure 2:
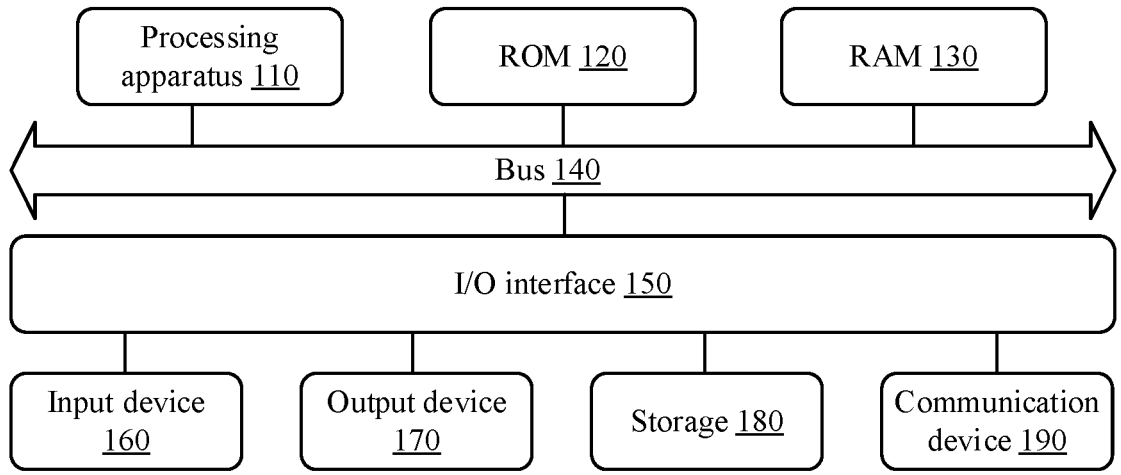
FIG. 2 is a schematic structural diagram of a device for processing a panoramic video according to an embodiment of the disclosure.

A hardware structure of the device for processing a panoramic video according to the embodiments of the disclosure will be described in detail. FIG. 2 is a schematic structural diagram of a device for processing a panoramic video according to an embodiment of the disclosure. The device shown in FIG. 2 is only exemplary, and should not indicate any limitation to the function and the application scope of the embodiments of the disclosure.

As shown in FIG. 2, the device for processing a panoramic video may include a processing apparatus 210 (such as a central processing unit or a graphics processor), which may execute various operations and processing based on a program stored in a Read-Only Memory (ROM) 220 or a program loaded from a storage 280 into a Random Access Memory (RAM) 230. The RAM 230 is further configured to store various programs and data required by the device for processing a panoramic video. The processing apparatus 210, the ROM 220 and the RAM 230 are connected to each other through a bus 240. An Input/Output (I/O) interface 250 is also connected to the bus 240.

Generally, the I/O interface 250 may be connected to: an input device 260, such as a touch screen, a touch panel, a keyboard, a mouse, a camera, a microphone, an accelerometer, and a gyroscope; an output device 270, such as a liquid crystal display (LCD), a speaker, and a vibrator; a storage 280 such as a magnetic tape and a hard disk; and a communication device 290. The communication device 290 enables wireless or wired communication between the device for processing a panoramic video and other devices for data exchanging. Although FIG. 2 shows the device for processing a panoramic video having various components, it should be understood that the illustrated components are not necessarily required to all be implemented or embodied. Alternatively, more or fewer devices may be implemented or included.

Particularly, according to an embodiment of the disclosure, the process described above in conjunction with flow charts may be implemented as a computer software program. For example, a computer program product is further provided by an embodiment in the disclosure, including a computer program carried on a computer readable medium. The computer program includes program code for performing the method shown in the flowchart. In the embodiment, the computer program may be downloaded and installed from the network via the communication device 290, or installed from the storage 280, or installed from the ROM 220. When the computer program is executed by the processing device 210, the functions defined in the method according to the embodiment of the disclosure are performed.

It is to be noted that, the computer readable medium mentioned herein may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof.

In the embodiments of the disclosure, the computer readable storage medium may be any tangible medium containing or storing a program, and the program may be used by or in combination with an instruction execution system, apparatus, or device. In the embodiments of the disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, radio frequency (RF) and the like, or any proper combination thereof.

The computer readable medium may be incorporated in the device for processing a panoramic video, or may exist alone without being assembled into the device for processing a panoramic video.

The computer readable medium contains one or more programs. The one or more programs, when executed by the device for processing a panoramic video, cause the device for processing a panoramic video to perform the method for processing a panoramic video according to the embodiments of the disclosure.

The computer program code for performing the operations disclosed in the disclosure may be written in one or more programming languages or combinations thereof. The programming languages include an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

The units and/or modules mentioned in the description of the embodiments of the disclosure may be implemented by means of software, or otherwise by means of hardware.

In terms of hardware, the units and/or modules of the device for processing a panoramic video according to the embodiments of the disclosure may be implemented by one or more application specific integrated circuits (ASICs), DSP, programmable logic device (PLD), complex programmable logic device (CPLD), field-programmable gate array (FPGA) or other electronic components, which are used to implement the method according to the embodiments of the disclosure.

Figure 3:
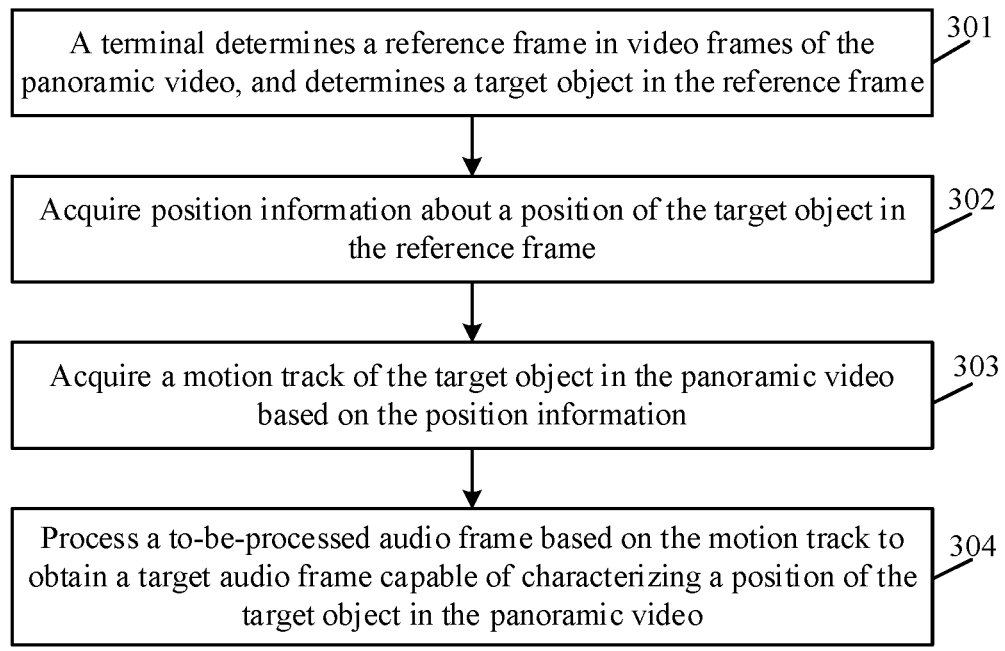
FIG. 3 is a schematic flowchart of a method for processing a panoramic video according to an embodiment of the disclosure.

Next, the method for processing a panoramic video according to the embodiments of the disclosure will be described. In actual implementation, the method for processing a panoramic video according to the embodiments of the disclosure may be implemented by a terminal or implemented by a terminal and a server in cooperation. Next, description is made by taking the method being implemented by a terminal as an example. FIG. 3 is a schematic flowchart of a method for processing a panoramic video according to an embodiment of the disclosure. Referring to FIG. 3, the method for processing a panoramic video according to an embodiment of the disclosure includes steps 301 to 304.

Step 301: a terminal determines a reference frame in video frames of the panoramic video, and determines a target object in the reference frame.

In actual implementation, the terminal decodes a panoramic video file to obtain multiple continuous video frames, and displays the decoded video frames. The user selects the reference frame based on the video frames displayed on the terminal. In practice, the first video frame of multiple continuous video frames in which the target object appears is usually selected as the reference frame. Accordingly, the terminal receives an object selection operation triggered by the user and determines a video frame targeted by the object selection operation as the reference frame. Correspondingly, each of the video frames of the panoramic video other than the reference frame is a non-reference frame.

Figure 4:
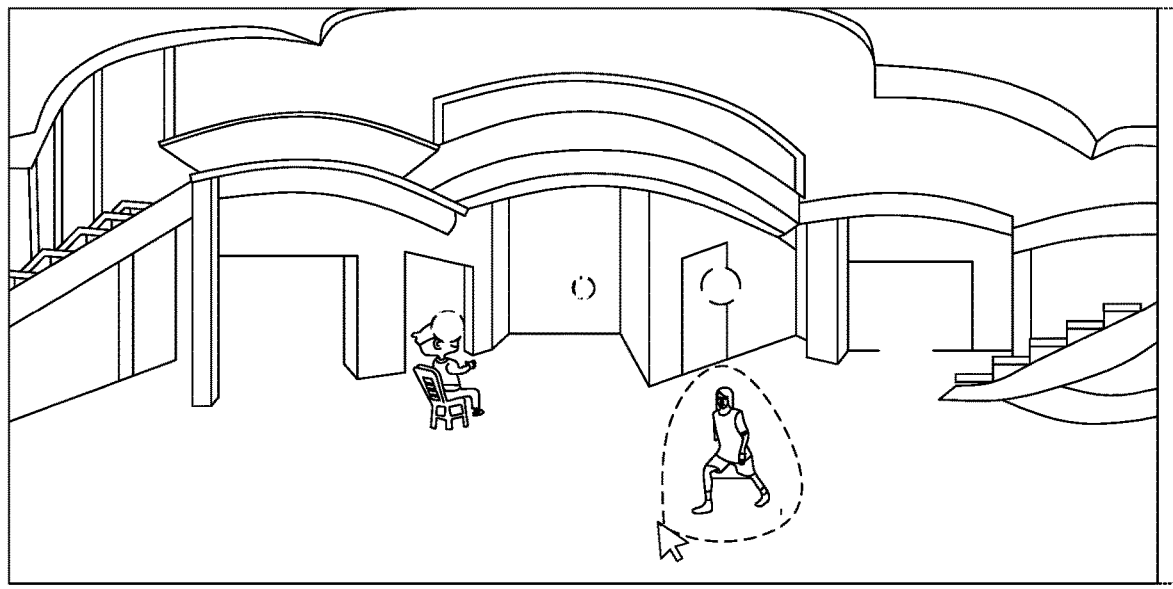
FIG. 4 is a schematic diagram of determining a target object in a reference frame according to an embodiment of the disclosure.

In some embodiments, the terminal may determine the target object in the reference frame by following operations: receiving an object selection operation for the reference frame; and determining the target object in the reference frame based on a region in the reference frame selected by the object selection operation. In practice, the object selection operation may be either a touch operation of the user or a pointer selection operation triggered by the user through a mouse. FIG. 4 is a schematic diagram of determining a target object in a reference frame according to an embodiment of the disclosure. As shown in FIG. 4, the target object is a specific person in the panoramic video, and the user may use the mouse to outline the person in the first video frame showing the person, so that a sliding track of a pointer of the mouse includes the person or an outline corresponding to the person. In this way, the selection of the reference frame and the target object is realized through human-computer interaction, so that the user can independently determine the target object corresponding to to-be-processed audio data, and the user experience is improved.

Step 302: acquire position information about a position of the target object in the reference frame.

In some embodiments, the terminal may acquire the position information about the position of the target object in the reference frame by following operations: identifying multiple feature points of the target object in the reference frame to obtain a feature point set corresponding to the target object; and acquiring the position information about the position of the target object in the reference frame based on the feature points in the feature point set.

The position information about the position of the target object in the reference frame includes: angle information about the position of the target object in the reference frame; and a center distance about the position of the target object in the panoramic video. The center distance is a distance between the position of the target object in the panoramic video and a center of a three-dimensional model corresponding to the reference frame.

Here, the identification of the feature points of the target object in the reference frame may be performed by the Scale-Invariant Feature Taransform (SIFT) technology or the Histogram of Oriented Gradient (HOG) technology.

In some embodiments, the terminal may acquire the position information about the position of the target object in the reference frame by following operations: determining a centre-of-gravity position of the multiple feature points in the feature point set; determining the angle information about the position of the target object in the panoramic video based on the centre-of-gravity position; acquiring a pixel area of a region occupied by the multiple feature points in the reference frame; and determining the center distance about the position of the target object in the panoramic video based on the pixel area.

Figure 5:
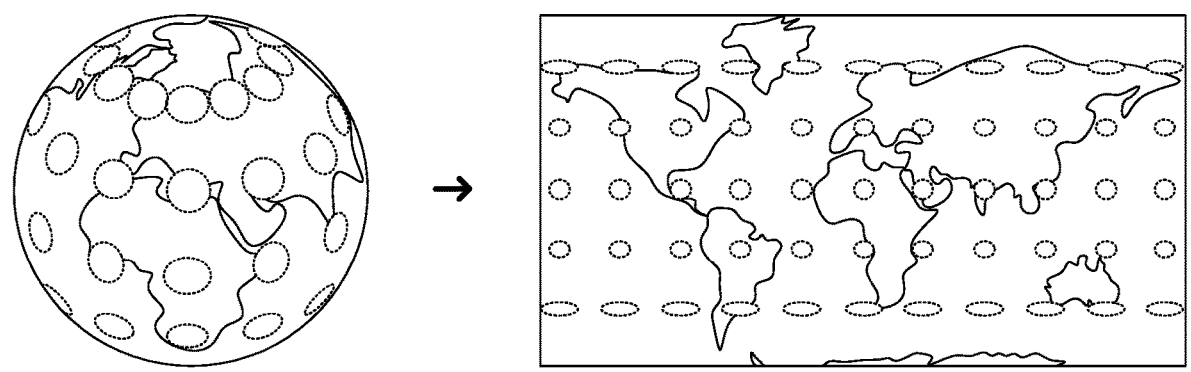
FIG. 5 is a schematic diagram shows a mapping relationship between a three-dimensional model of a panoramic video and a two-dimensional image according to an embodiment of the disclosure.
Figure 6:
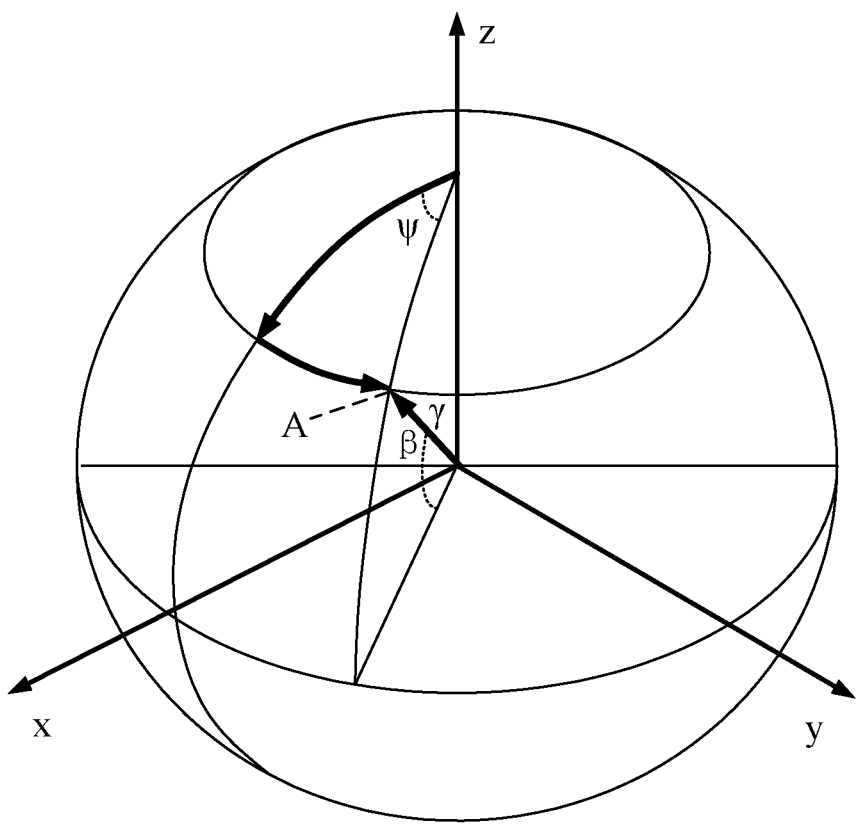
FIG. 6 is a schematic diagram shows a spherical coordinate system corresponding to a panoramic video according to an embodiment of the disclosure.

Here, first, the angle information about a specific position in the panoramic video is described. In practice, there is a fixed mapping relationship between a pixel point coordinate of a pixel point in the video frame of the panoramic video and a spherical coordinate of the pixel point in the three-dimensional model. FIG. 5 is a schematic diagram shows a mapping relationship between a three-dimensional model of a panoramic video and a two-dimensional image according to an embodiment of the disclosure. Referring to FIG. 5, which shows an isometric histogram according to the Tissot Indicatrix projection. FIG. 5 shows the mapping relationship between a 360° panoramic space and a 360° panoramic video frame. FIG. 6 is a schematic diagram shows a spherical coordinate system corresponding to a panoramic video according to an embodiment of the disclosure. Referring to FIG. 6, for any position A (that is, any point on the spherical surface) in the panoramic video, the angle information about the position A includes a horizontal rotation angle $\psi$ and a vertical rotation angle $\beta$.

Based on the above description of the angle information, in some embodiments, the angle information about the position of the target object of the reference frame in the panoramic video may be determined by following operations: determining a pixel point coordinate of a pixel point corresponding to the centre-of-gravity position of the multiple feature points; and converting the pixel point coordinate into a spherical coordinate in the three-dimensional model. The spherical coordinate indicates an angle corresponding to the position of the target object in the panoramic video.

Figure 7:
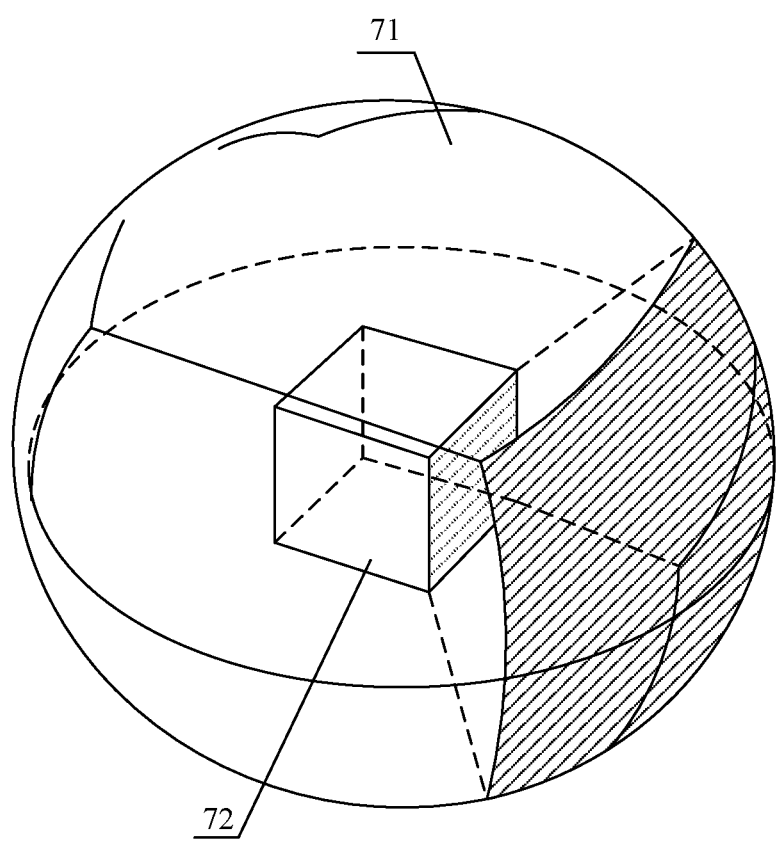
FIG. 7 is a schematic diagram shows a three-dimensional model projection of a panoramic video according to an embodiment of the disclosure.
Figure 8:
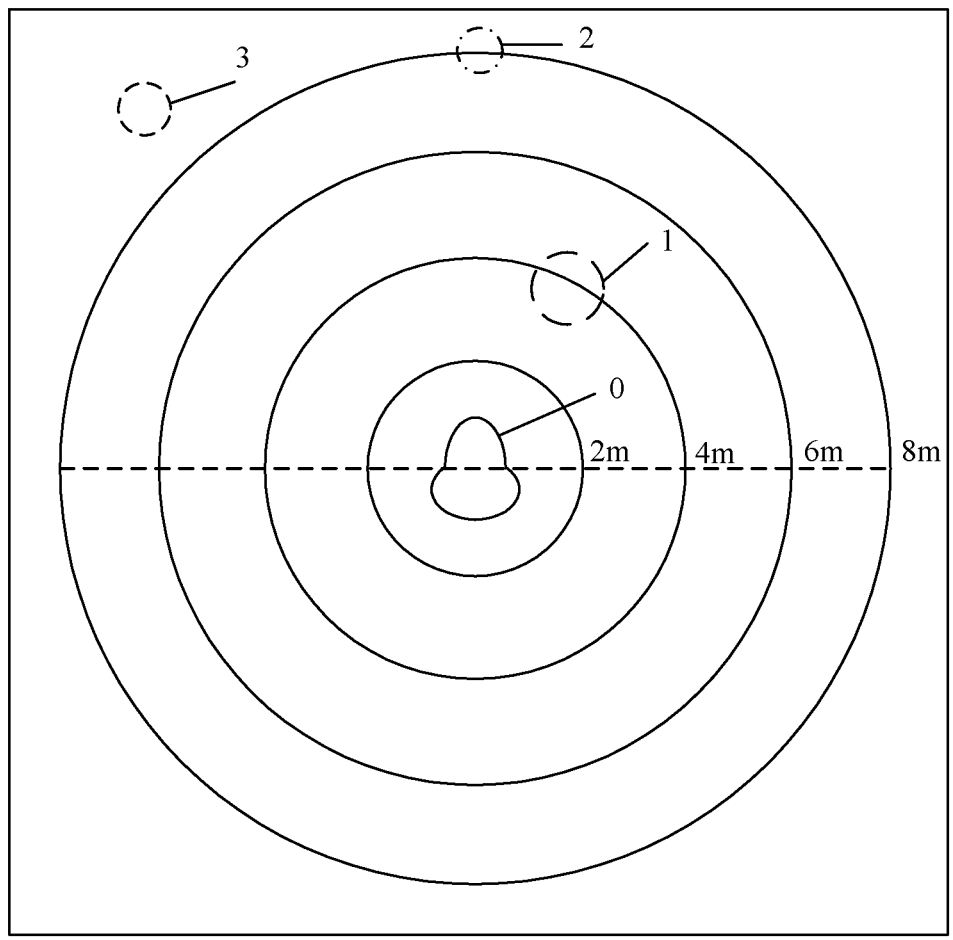
FIG. 8 is a schematic diagram shows a center distance of an object in a panoramic video according to an embodiment of the disclosure.

Next, the center distance about the position of the target object in the panoramic video is described. A case that the three-dimensional model of the panoramic video is a spherical model is taken as an example. Reference is made to FIG. 7, which is a schematic diagram shows a three-dimensional model projection of a panoramic video according to an embodiment of the disclosure. A virtual lens 72 corresponding to a human eye is simulated at the center of the spherical model 71. The virtual lens and the play window have the same field of view, therefore, a projection area of the field of view of the play window in the surface texture of the spherical model is the content that can be viewed in the video frame through the play window. The distance between the target object in the video frame and the virtual lens is the center distance about the position of the target object in the panoramic video. The pixel area of the target object in the panoramic video decreases, when the center distance about the position of the target object in the panoramic video increases. The pixel area of the target object in the panoramic video increases, when the center distance about the position of the target object in the panoramic video decreases. FIG. 8 is a schematic diagram shows a center distance of an object in a panoramic video according to an embodiment of the disclosure. Referring to FIG. 8, the numbers 1, 2, and 3 indicate the objects in a video frame of the panoramic video, the number 0 indicates the virtual lens in the three-dimensional model of the panoramic video. A case that the object indicated by 1 is the target object is taken as an example, and the center distance about the position of the target object is 4 m.

Based on the above description of the center distance, in some embodiments, the center distance about the position of the target object in the panoramic video may be determined by following operations: determining the center distance about the position of the target object in the panoramic video based on an inverse relationship between a pixel area of a region occupied by the multiple feature points in the reference frame and a square of the center distance.

Here, the pixel area of the region occupied by the multiple feature points in the reference frame may be understood as the pixel area occupied by the target object in the reference frame.

In some embodiments, the relationship between the center distance d about the position of the target object in the panoramic video and the pixel area Area occupied by the target object in the current reference frame is as follows:

$$d = k\sqrt{\frac{1}{\text{Area}}}$$

k is an adjustment coefficient, and the specific value of k may be set according to the actual situation.

Step 303: acquire a motion track of the target object in the panoramic video based on the position information.

In some embodiments, the motion track of the target object in the panoramic video may be acquired by following operations: acquiring position information about a position of the target object in each non-reference frame of the panoramic video; and determining the motion track of the target object in the panoramic video based on the position information about the position of the target object in the reference frame and the position information about a position of the target object in each non-reference frame.

Next, the acquisition of the position information about a position of the target object in the non-reference frame is described. In some embodiments, the position of the target object in the non-reference frame may be determined by following operations: performing feature point matching on the multiple feature points of the target object in the feature point set and feature points of the target object in a non-reference frame of the panoramic video to obtain a feature point matching result; and determining the position of the target object in the non-reference frame based on the feature point matching result.

Here, it should be noted that the acquisition of the position information about a position of the target object in the non-reference frame may be performed frame by frame, that is, for multiple continuous non-reference frames, the acquisition of the position information about a position of the target object in the non-reference frame may be performed in an order of play time of the non-reference frames. That is, the feature point matching on the feature points in the feature point set and feature points in the non-reference frame is performed sequentially. In a process of performing the feature point matching on the feature points in the feature point set and feature points in the non-reference frame, firstly, the target object in the non-reference frame may be located based on the feature points in the feature point set, and then feature points of the target object in the non-reference frame may be extracted based on the target object in the non-reference frame, and then the feature point matching is performed on the extracted feature points and the feature points in the feature point set.

In some embodiments, the position of the target object in the non-reference frame may be determined based on the feature point matching result by following operations: selecting, based on the feature point matching result, a feature point in the non-reference frame a similarity between which and one of the feature points in the reference frame is greater than a first similarity threshold; and determining the position of the target object in the non-reference frame based on the selected feature point in the non-reference frame the similarity between which and one of the feature points in the reference frame is greater than the first similarity threshold.

Here, in practice, the value of the first similarity threshold may be set based on actual needs. Specifically, the setting of the first similarity threshold can guarantee the following case: when a similarity between a first feature point of the target object in the reference frame and a second feature point in the feature point set is greater than the first similarity threshold, the first feature point and the second feature point are the same feature point of the target object.

In practice, there is the following situation. Due to the movement or rotation of the target object, one or more feature points of the target object identified in a first video frame do not appear in a second video frame, that is, the one or more feature points of the target object identified in the first video frame cannot be detected in the second video frame. The playback time of the second video frame is later than the playback time of the first video frame. In this case, in order to ensure that the target object is not lost in a process of the target object being tracked when the target object continuously rotates and changes, when a feature point no longer appears in continuous multiple image frames, the feature point that no longer appears need to be deleted from the feature point set.

Correspondingly, in some embodiments, the feature points in the feature point set may also be updated by the following operation: acquiring the feature point matching results between each of a preset number of non-reference frames and the feature points in the feature point set, where the preset number of non-reference frames are continuous video frames of the panoramic video; determining a to-be-deleted feature point in the feature point set based on the feature point matching results, where a similarity between the to-be-deleted feature point and each of the feature points in the preset number of non-reference frames is less than a third similarity threshold; and deleting the to-be-deleted feature point from the feature point set.

Here, in practice, the value of the third similarity threshold may be set according to actual conditions. Specifically, the value of the third similarity threshold can guarantee the following case: when a similarity between a third feature point in the feature point set and a fourth feature point of the target object in the non-reference frame is less than the third similarity threshold, the third feature point and the fourth feature point are different feature points, and it is deemed that the third feature point is not detected in the non-reference frame. The specific number of the above non-reference frames may be set according to actual needs. For example, 5 continuous non-reference frames may be acquired, when a feature point in the feature point set does not appear in the 5 continuous non-reference frames, that is, the feature point matching results indicate that the similarity between the feature point and each of the feature points in the 5 continuous non-reference frames is less than the third similarity threshold, the feature point is deleted from the feature point set.

In practice, there is the following situation. Due to the movement or rotation of the target object, one or more feature points detected in the non-reference frame do not exist in the feature point set during performing the feature point matching. In this case, in order to ensure that the target object is not lost in a process of the target object being tracked when the target object continuously rotates and changes, when a new feature point of the target object is detected, the new feature point needs to be added to the feature point set.

Correspondingly, in some embodiments, the feature points in the feature point set may also be updated by the following operation: selecting, based on the feature point matching result, a feature point in the non-reference frame a similarity between which and each of the feature points in the feature point set is less than a second similarity threshold; and updating the feature points in the feature point set based on the selected feature point in the non-reference frame the similarity between which and each of the feature points in the feature point set is less than the second similarity threshold.

Here, in practice, the value of the second similarity threshold may be set according to actual conditions. Specifically, the value of the second similarity threshold can guarantee the following case: when a similarity between a fifth feature point of the target object in the non-reference frame and each of the feature points in the feature point set is less than the second similarity threshold, it is deemed that the feature point set does not include the fifth feature point, that is, the fifth feature point is a new feature point of the target object.

Step 304: process a to-be-processed audio frame based on the motion track to obtain a target audio frame capable of characterizing a position of the target object in the panoramic video.

In some embodiments, the to-be-processed audio frame may be processed to obtain a target audio frame capable of characterizing a position of the target object in the panoramic video by following operations: invoking a three-dimensional audio engine to perform mixing processing on the to-be-processed audio frame based on the motion track, to obtain the target audio frame capable of characterizing the position of the target object in the panoramic video. In this way, it is possible to automatically dub the target object based on the motion track of the target object in the panoramic video, and accurately restore a sounding direction of the target object.

In some embodiments, after obtaining the target audio frame capable of characterizing the position of the target object in the panoramic video, the target audio frame is synthesized with the video frames of the panoramic video to obtain a panoramic video file. When playing the panoramic video file, the sound of the target object can accurately reflect the position of the target object in the panoramic video.

Figure 9:
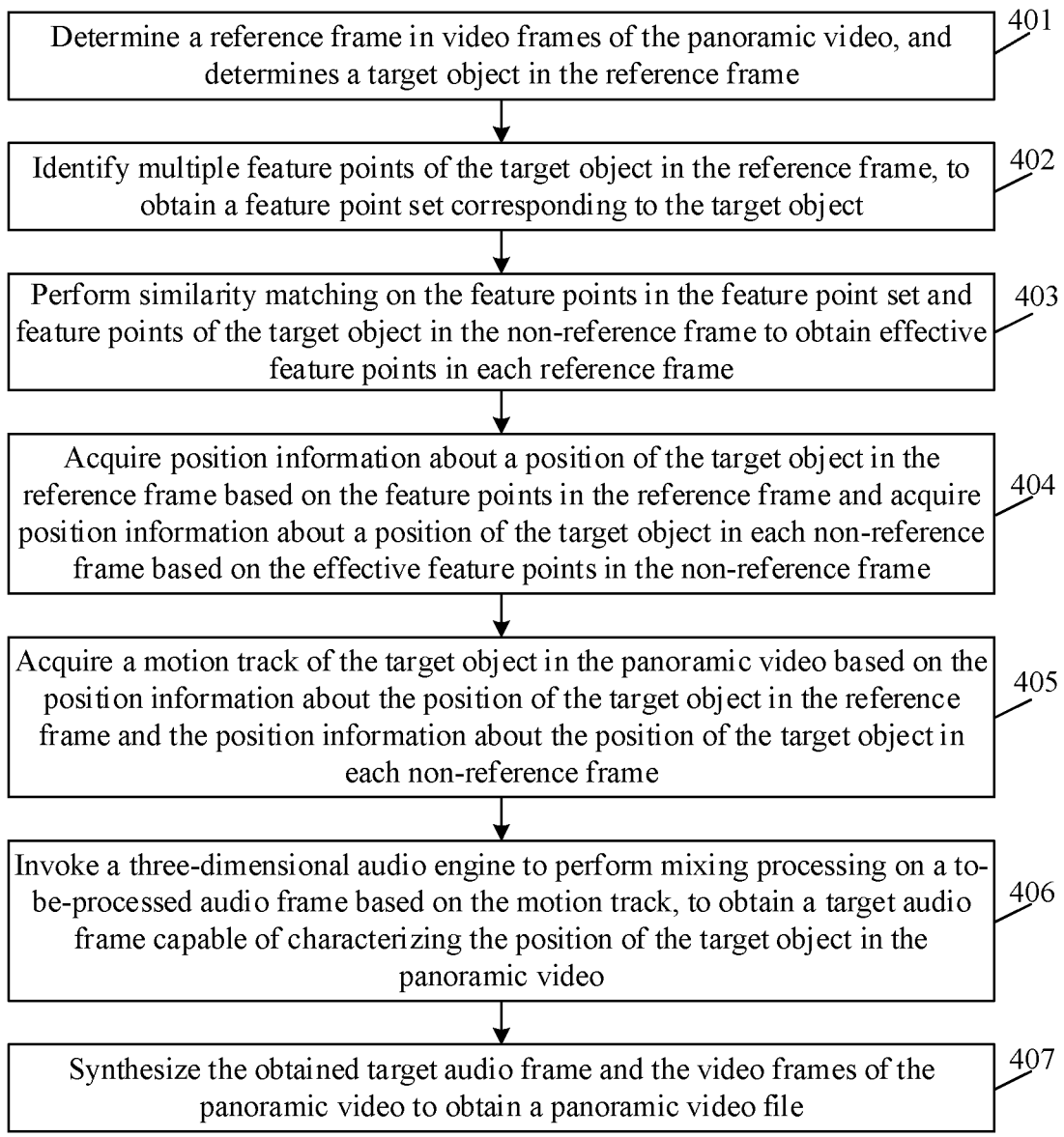
FIG. 9 is a schematic flowchart of a method for processing a panoramic video according to an embodiment of the disclosure.

Continue to describe the method for processing a panoramic video according to the embodiments of the disclosure. FIG. 9 is a schematic flowchart of a method for processing a panoramic video according to an embodiment of the disclosure. Referring to FIG. 9, the method for processing a panoramic video according to an embodiment of the disclosure includes steps 401 to 407.

Step 401: determine a reference frame in video frames of the panoramic video, and determines a target object in the reference frame.

In actual implementation, the decoded panoramic video includes multiple image frames. On the image frame where the target object appears, a region where the target object is located is delineated through software interaction, such as drawing with a mouse. For example, if the object is a person, outline the outline of the person.

Step 402: identify multiple feature points of the target object in the reference frame, to obtain a feature point set corresponding to the target object.

Here, in actual implementation, the key point recognition technology, such as SIFT or HoG, may be used to identify the multiple feature points of the target object in the reference frame, to obtain a set of feature points, i.e., a feature point set corresponding to the target object.

Step 403: perform similarity matching on the feature points in the feature point set and feature points of the target object in the non-reference frame to obtain effective feature points in each reference frame.

Here, the effective feature point in the reference frame is the feature point a similarity between which and one of the feature points in the feature point set is greater than a similarity threshold.

In actual implementation, in the process of performing similarity matching on the feature points, it is necessary to update the feature points in the feature point set in real time, such as deleting a feature point in the feature point set that do not appear in N continuous frames, and adding a feature point of the target object that do not exist in the feature point set. For the specific updating method, foregoing embodiment may be referred.

Step 404: acquire position information about a position of the target object in the reference frame based on the feature points in the reference frame and acquire position information about a position of the target object in each non-reference frame based on the effective feature points in the non-reference frame.

The position information includes: angle information about the position of the target object in the panoramic video; and a center distance about the position of the target object in the panoramic video. The center distance is a distance between the position of the target object in the panoramic video and a center of a three-dimensional model corresponding to the reference frame. For the calculation of the angle information and the center distance, refer to the foregoing embodiments. In some embodiments, a spherical coordinate corresponding to the position of the target object in the panoramic video may be used to represent the position information of the target object.

Step 405: acquire a motion track of the target object in the panoramic video based on the position information about the position of the target object in the reference frame and the position information about the position of the target object in each non-reference frame.

Here, taking the position information of the target object represented by a spherical coordinate as an example. A curve corresponding to the motion track of the target object is drawn based on the spherical coordinate corresponding to the position of the target object in the reference frame and the spherical coordinate corresponding to the position of the target object in each non-reference frame. A smoothing process is performed on the curve to obtain a target curve that characterizes the motion track of the target object in the panoramic video.

Step 406: invoke a three-dimensional audio engine to perform mixing processing on a to-be-processed audio frame based on the motion track, to obtain a target audio frame capable of characterizing the position of the target object in the panoramic video.

Step 407: synthesize the obtained target audio frame and the video frames of the panoramic video to obtain a panoramic video file.

Figure 10:
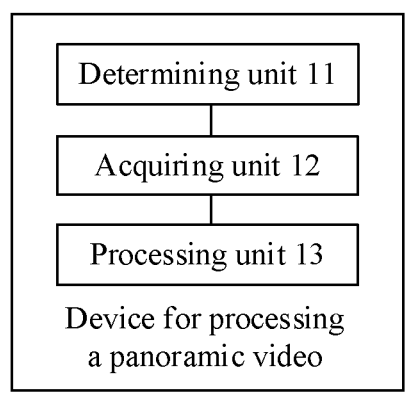
FIG. 10 is a schematic structural diagram of a device for processing a panoramic video according to an embodiment of the disclosure.

Next, a device for processing a panoramic video according to an embodiment of the disclosure implemented by software units is described. FIG. 10 is a schematic structural diagram of a device for processing a panoramic video according to an embodiment of the disclosure. Referring to FIG. 10, the device for processing a panoramic video according to an embodiment of the disclosure includes a determining unit 11, an acquiring unit 12, and a processing unit 13. The determining unit 11 is configured to determine a reference frame in video frames of the panoramic video, and determine a target object in the reference frame. The acquiring unit 12 is configured to acquire position information about a position of the target object in the reference frame, and acquire a motion track of the target object in the panoramic video based on the position information. The processing unit 13 is configured to process a to-be-processed audio frame based on the motion track to obtain a target audio frame capable of characterizing a position of the target object in the panoramic video. The target audio frame is used to be synthesized with the video frames of the panoramic video to obtain a panoramic video file.

In some embodiments, the acquiring unit is further configured to: identify multiple feature points of the target object in the reference frame to obtain a feature point set corresponding to the target object; and acquire the position information about the position of the target object in the reference frame based on the feature points in the feature point set. The position information includes: angle information about the position of the target object in the panoramic video; and a center distance about the position of the target object in the panoramic video. The center distance is a distance between the position of the target object in the panoramic video and a center of a three-dimensional model corresponding to the reference frame.

In some embodiments, the acquiring unit is further configured to: determine a centre-of-gravity position of the multiple feature points in the feature point set; determine the angle information about the position of the target object in the panoramic video based on the centre-of-gravity position; acquire a pixel area of a region occupied by the multiple feature points in the reference frame; and determine the center distance about the position of the target object in the panoramic video based on the pixel area.

In some embodiments, the acquiring unit is further configured to: determine a pixel point coordinate of a pixel point corresponding to the centre-of-gravity position; and convert the pixel point coordinate into a spherical coordinate in the three-dimensional model. The spherical coordinate indicates an angle corresponding to the position of the target object in the panoramic video.

In some embodiments, the acquiring unit is further configured to determine the center distance about the position of the target object in the panoramic video based on an inverse relationship between the pixel area and a square of the center distance.

In some embodiments, the device further includes a matching unit configured to perform feature point matching on the multiple feature points in the feature point set and feature points in a non-reference frame of the panoramic video to obtain a feature point matching result. The acquiring unit is further configured to determine a position of the target object in the non-reference frame based on the feature point matching result.

In some embodiments, the acquiring unit is further configured to: select, based on the feature point matching result, a feature point in the non-reference frame a similarity between which and one of the feature points in the feature point set is greater than a first similarity threshold; and determine the position of the target object in the non-reference frame based on the selected feature point in the non-reference frame the similarity between which and one of the feature points in the feature point set is greater than the first similarity threshold.

In some embodiments, the acquiring unit is further configured to: acquire position information about a position of the target object in each non-reference frame of the panoramic video; and determine the motion track of the target object in the panoramic video based on the position information about the position of the target object in the reference frame and the position information about a position of the target object in each non-reference frame.

In some embodiments, the device further includes an updating unit configured to: select, based on the feature point matching result, a feature point in the non-reference frame a similarity between which and each of the feature points in the feature point set is less than a second similarity threshold; and update the feature points in the feature point set based on the selected feature point in the non-reference frame the similarity between which and each of the feature points in the feature point set is less than the second similarity threshold.

In some embodiments, the device further includes a deleting unit configured to: acquire the feature point matching results between each of a preset number of non-reference frames and the feature points in the feature point set, where the preset number of non-reference frames are continuous video frames of the panoramic video; determine a to-be-deleted feature point in the feature point set based on the feature point matching results, where a similarity between the to-be-deleted feature point and each of the feature points in the preset number of non-reference frames is less than a third similarity threshold; and delete the to-be-deleted feature point from the feature point set.

In some embodiments, the determining unit is further configured to: receive an object selection operation for the reference frame; and determine the target object in the reference frame based on a region in the reference frame selected by the object selection operation.

In some embodiments, the processing unit is further configured to invoke a three-dimensional audio engine to perform mixing processing on the to-be-processed audio frame based on the motion track, to obtain the target audio frame capable of characterizing the position of the target object in the panoramic video.

It should be noted that, the above description of the device is similar to the description of the method, and the description of the beneficial effects of the device that are the same as the beneficial effects of the method is not repeated here. For the technical details that are not disclosed in the device according to the embodiment of the disclosure, please refer to the description of the method embodiment of the disclosure.

A storage medium is provided according to an embodiment of the disclosure. The non-transitory storage medium stores executable instructions. The executable instructions, when executed by a processor, cause the processor to implement the method for processing a panoramic video according to the embodiments of the disclosure.

The above description includes merely embodiments of the disclosure and explanations of technical principles used. Those skilled in the art should understand that the disclosure scope of the embodiment of the disclosure is not limited to technical solutions formed by a specific combination of the above technical features, but covers other technical solutions formed by any combination of the above technical features or equivalent features thereof without departing from a concept of the disclosed embodiments. For example, a technical solution formed by interchanging the above features and technical features having similar functions as disclosed, but not limited to, in the disclosure with each other is also covered with the scope of the disclosure.

The invention claimed is:

1. A method for processing a panoramic video, comprising:
determining a reference frame in video frames of the panoramic video, and determining a target object in the reference frame;
acquiring position information about a position of the target object in the reference frame, wherein the position information comprises angle information about the position of the target object in the panoramic video and a center distance about the position of the target object in the panoramic video;
identifying a plurality of feature points of the target object in the reference frame;
acquiring a pixel area of a region occupied by the plurality of feature points in the reference frame;
determining the center distance about the position of the target object in the panoramic video based on an inverse relationship between the pixel area and a square of the center distance, wherein the center distance is a distance between the position of the target object in the panoramic video and a center of a three-dimensional model corresponding to the reference frame;
acquiring a motion track of the target object in the panoramic video based on the position information; and
processing a to-be-processed audio frame based on the motion track to obtain a target audio frame capable of characterizing a position of the target object in the panoramic video, wherein the target audio frame is used to be synthesized with the video frames of the panoramic video to obtain a panoramic video file.

2. The method according to claim 1, wherein the acquiring position information about a position of the target object in the reference frame comprises:
obtaining a feature point set corresponding to the target object by identifying the plurality of feature points of the target object in the reference frame; and
acquiring the position information about the position of the target object in the reference frame based on the feature points in the feature point set.

3. The method according to claim 2, wherein the acquiring the position information about the position of the target object in the reference frame based on the feature points in the feature point set comprises:
determining a centre-of-gravity position of the plurality of feature points in the feature point set; and
determining the angle information about the position of the target object in the panoramic video based on the centre-of-gravity position.

4. The method according to claim 3, wherein the determining the angle information about the position of the target object in the panoramic video based on the centre-of-gravity position comprises:
determining a pixel point coordinate of a pixel point corresponding to the centre-of-gravity position; and
converting the pixel point coordinate into a spherical coordinate in the three-dimensional model, wherein the spherical coordinate indicates an angle corresponding to the position of the target object in the panoramic video.

5. The method according to claim 2, further comprising:
performing feature point matching on the plurality of feature points in the feature point set and feature points in a non-reference frame of the panoramic video to obtain a feature point matching result; and
determining a position of the target object in the non-reference frame based on the feature point matching result.

6. The method according to claim 5, wherein the determining a position of the target object in the non-reference frame based on the feature point matching result comprises:
selecting, based on the feature point matching result, a feature point in the non-reference frame a similarity between which and one of the feature points in the feature point set is greater than a first similarity threshold; and
determining the position of the target object in the non-reference frame based on the selected feature point in the non-reference frame the similarity between which and one of the feature points in the feature point set is greater than the first similarity threshold.

7. The method according to claim 1, wherein the acquiring a motion track of the target object in the panoramic video based on the position information comprises:

acquiring position information about a position of the target object in each non-reference frame of the panoramic video; and determining the motion track of the target object in the panoramic video based on the position information about the position of the target object in the reference frame and the position information about a position of the target object in each non-reference frame.

8. The method according to claim 5, further comprising:
selecting, based on the feature point matching result, a feature point in the non-reference frame a similarity between which and each of the feature points in the feature point set is less than a second similarity threshold; and
updating the feature points in the feature point set based on the selected feature point in the non-reference frame the similarity between which and each of the feature points in the feature point set is less than the second similarity threshold.

9. The method according to claim 5, further comprising:
acquiring the feature point matching results between each of a preset number of non-reference frames and the feature points in the feature point set, wherein the preset number of non-reference frames are continuous video frames of the panoramic video;
determining a to-be-deleted feature point in the feature point set based on the feature point matching results, wherein a similarity between the to-be-deleted feature point and each of the feature points in the preset number of non-reference frames is less than a third similarity threshold; and
deleting the to-be-deleted feature point from the feature point set.

10. The method according to claim 1, wherein the determining a target object in the reference frame comprises:
receiving an object selection operation for the reference frame; and
determining the target object in the reference frame based on a region in the reference frame selected by the object selection operation.

11. The method according to claim 1, wherein the processing a to-be-processed audio frame based on the motion track to obtain a target audio frame capable of characterizing a position of the target object in the panoramic video comprises:
invoking a three-dimensional audio engine to perform mixing processing on the to-be-processed audio frame based on the motion track, to obtain the target audio frame capable of characterizing the position of the target object in the panoramic video.

12. A device for processing a panoramic video, comprising:
a memory storing executable instructions;
a processor configured to execute the executable instructions to implement operations comprising:
determining a reference frame in video frames of the panoramic video, and determine a target object in the reference frame;
acquiring position information about a position of the target object in the reference frame, and acquire a motion track of the target object in the panoramic video based on the position information, wherein the position information comprises angle information about the position of the target object in the panoramic video and a center distance about the position of the target object in the panoramic video;

identifying a plurality of feature points of the target object in the reference frame;
acquiring a pixel area of a region occupied by the plurality of feature points in the reference frame;
determining the center distance about the position of the target object in the panoramic video based on an inverse relationship between the pixel area and a square of the center distance, wherein the center distance is a distance between the position of the target object in the panoramic video and a center of a three-dimensional model corresponding to the reference frame; and
processing a to-be-processed audio frame based on the motion track to obtain a target audio frame capable of characterizing a position of the target object in the panoramic video, wherein the target audio frame is used to be synthesized with the video frames of the panoramic video to obtain a panoramic video file.

13. The device according to claim 12, wherein the processor configured to execute the executable instructions to implement operations comprising:
obtaining a feature point set corresponding to the target object by identifying the plurality of feature points of the target object in the reference frame; and
acquiring the position information about the position of the target object in the reference frame based on the feature points in the feature point set.

14. The device according to claim 13, wherein the processor configured to execute the executable instructions to implement operations comprising:
determining a centre-of-gravity position of the plurality of feature points in the feature point set; and
determining the angle information about the position of the target object in the panoramic video based on the centre-of-gravity position.

15. The device according to claim 14, wherein the processor configured to execute the executable instructions to implement operations comprising:
determining a pixel point coordinate of a pixel point corresponding to the centre-of-gravity position; and
converting the pixel point coordinate into a spherical coordinate in the three-dimensional model, wherein the spherical coordinate indicates an angle corresponding to the position of the target object in the panoramic video.

16. The device according to claim 13, the processor configured to execute the executable instructions to implement operations comprising:
performing feature point matching on the plurality of feature points in the feature point set and feature points in a non-reference frame of the panoramic video to obtain a feature point matching result;
determining a position of the target object in the non-reference frame based on the feature point matching result.

17. The device according to claim 16, wherein the processor configured to execute the executable instructions to implement operations comprising:
selecting, based on the feature point matching result, a feature point in the non-reference frame a similarity between which and one of the feature points in the feature point set is greater than a first similarity threshold; and
determining the position of the target object in the non-reference frame based on the selected feature point in the non-reference frame the similarity between which and one of the feature points in the feature point set is greater than the first similarity threshold.

18. A non-transitory storage medium storing executable instructions, wherein the executable instructions are used to implement operations comprising:
- determining a reference frame in video frames of the panoramic video, and determining a target object in the reference frame;
- acquiring position information about a position of the target object in the reference frame, wherein the position information comprises angle information about the position of the target object in the panoramic video and a center distance about the position of the target object in the panoramic video;
- identifying a plurality of feature points of the target object in the reference frame;
- acquiring a pixel area of a region occupied by the plurality of feature points in the reference frame:
- determining the center distance about the position of the target object in the panoramic video based on an inverse relationship between the pixel area and a square of the center distance, wherein the center distance is a distance between the position of the target object in the panoramic video and a center of a three-dimensional model corresponding to the reference frame;
- acquiring a motion track of the target object in the panoramic video based on the position information; and
- processing a to-be-processed audio frame based on the motion track to obtain a target audio frame capable of characterizing a position of the target object in the panoramic video, wherein the target audio frame is used to be synthesized with the video frames of the panoramic video to obtain a panoramic video file.

* * * * *